March 15, 1938.  C. F. TOUSSAINT  2,111,230
FLUID REGULATING VALVE
Filed Dec. 23, 1935  3 Sheets-Sheet 1

INVENTOR
Charles F. Toussaint
BY
ATTORNEYS

March 15, 1938.  C. F. TOUSSAINT  2,111,230
FLUID REGULATING VALVE
Filed Dec. 23, 1935  3 Sheets-Sheet 2
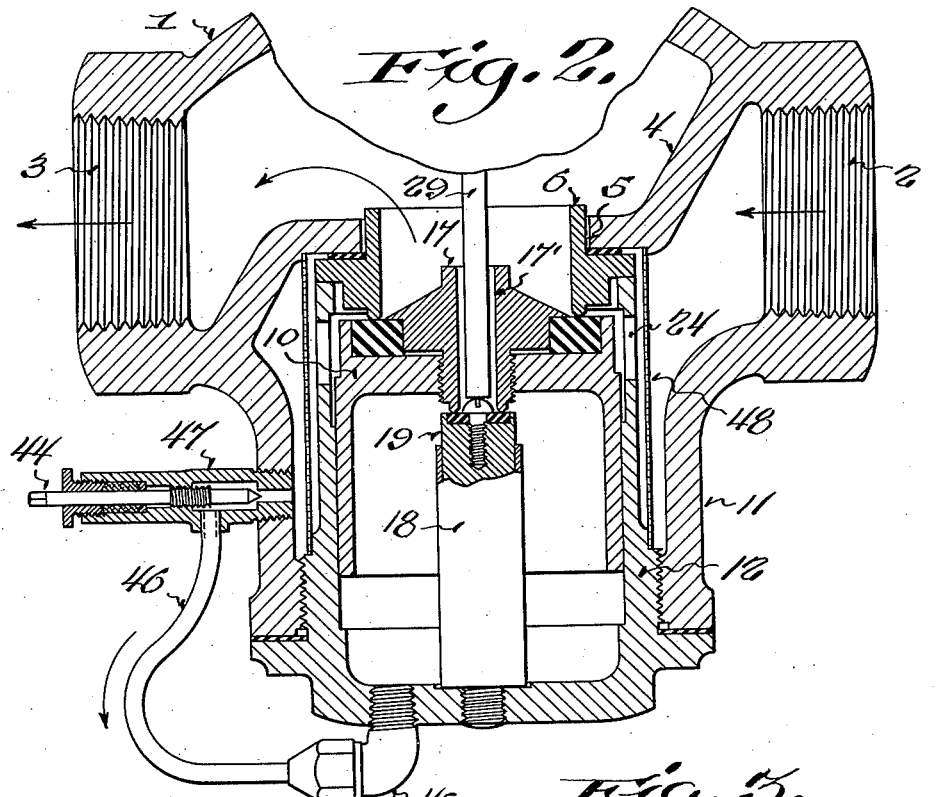
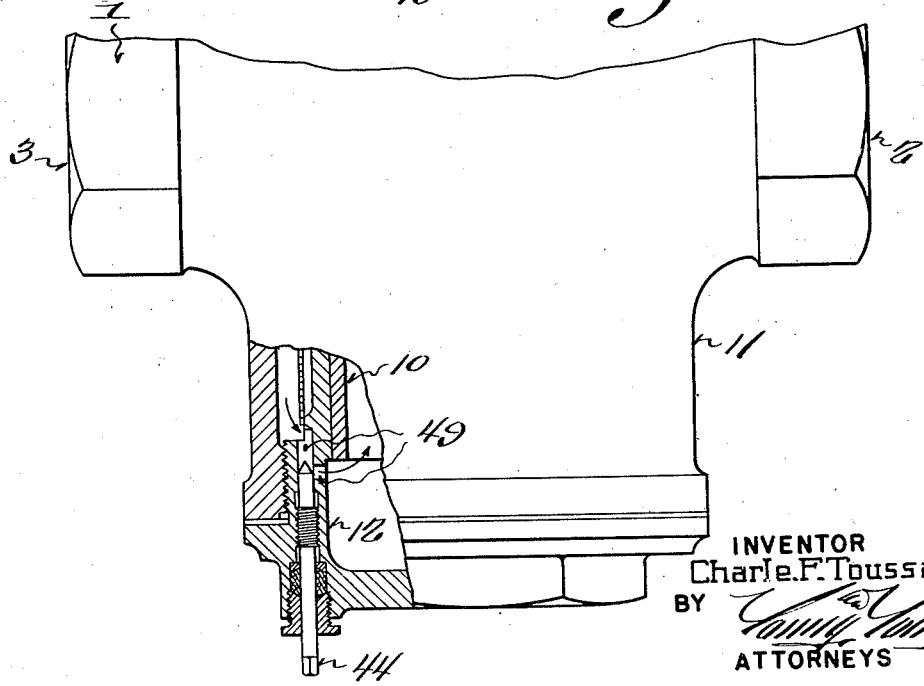
INVENTOR
Charle.F.Toussaint
BY
ATTORNEYS March 15, 1938. C. F. TOUSSAINT 2,111,230
FLUID REGULATING VALVE
Filed Dec. 23, 1935 3 Sheets-Sheet 3
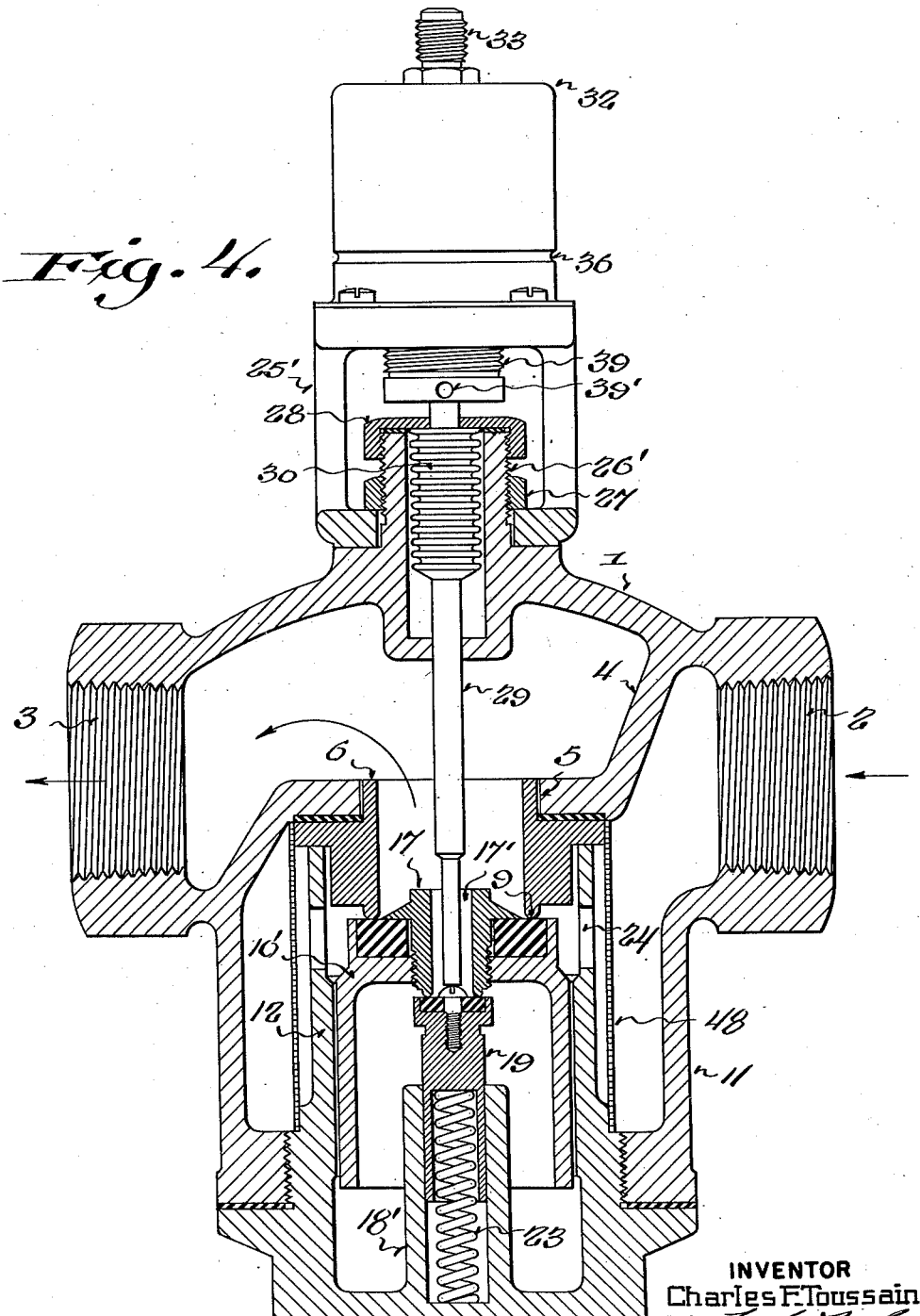
Fig. 4.
INVENTOR
Charles F. Toussaint.
BY
ATTORNEYS.

Patented Mar. 15, 1938

2,111,230

UNITED STATES PATENT OFFICE 2,111,230

FLUID REGULATING VALVE

Charles F. Toussaint, Chicago, Ill., assignor, by mesne assignments, to The Electrimatic Corporation, Chicago, Ill., a corporation of Illinois Application December 23, 1935, Serial No. 55,818

3 Claims. (Cl. 137—153)

This invention relates to fluid-regulating valves, and more particularly to a pressure-actuated valve.

Valves of the character to which the present invention pertains have many applications, such as regulating circulation of water, steam, oil, gas, and the like. Therefore, no attempt will be made to describe a specific use, but the subject will be treated broadly as applied to the control of any circulated pressure fluid.

The invention has primarily for its object the provision of a fluid-regulating valve, including pressure-actuated means functioning in cooperation with the valve to eliminate chattering; to provide full opening and tight closing; quiet operation; and to insure regulation of the flow of pressure fluid to a high degree of accuracy, regardless of varying pressure.

Incidental to the foregoing, a more specific object of the present invention is to provide a regulating piston valve with a pressure-actuated pilot valve for controlling operation of the piston valve.

A still further object is to provide adjustable means for predetermining the capacity of the valve, within certain range limits, depending upon the fluid supply pressure, regardless of variation in such pressure.

Other objects reside in the novel features of design and structure, which will be more apparent as the description proceeds.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings are illustrated several forms of the physical embodiments of the present invention constructed according to the best mode so far devised for the practical applications of the principles thereof.

In the drawings:

Figure 2 is a similar fragmentary section illustrating a modified form of manually controlled bypass.

Figure 3 is a fragmentary elevation with parts broken away and in section, illustrating still another form of manually controlled by-pass, and Figure 4 illustrates a valve incorporating the salient features of the present invention, and in which the compensating or manually controlled by-pass valve is eliminated.

Figure 1:
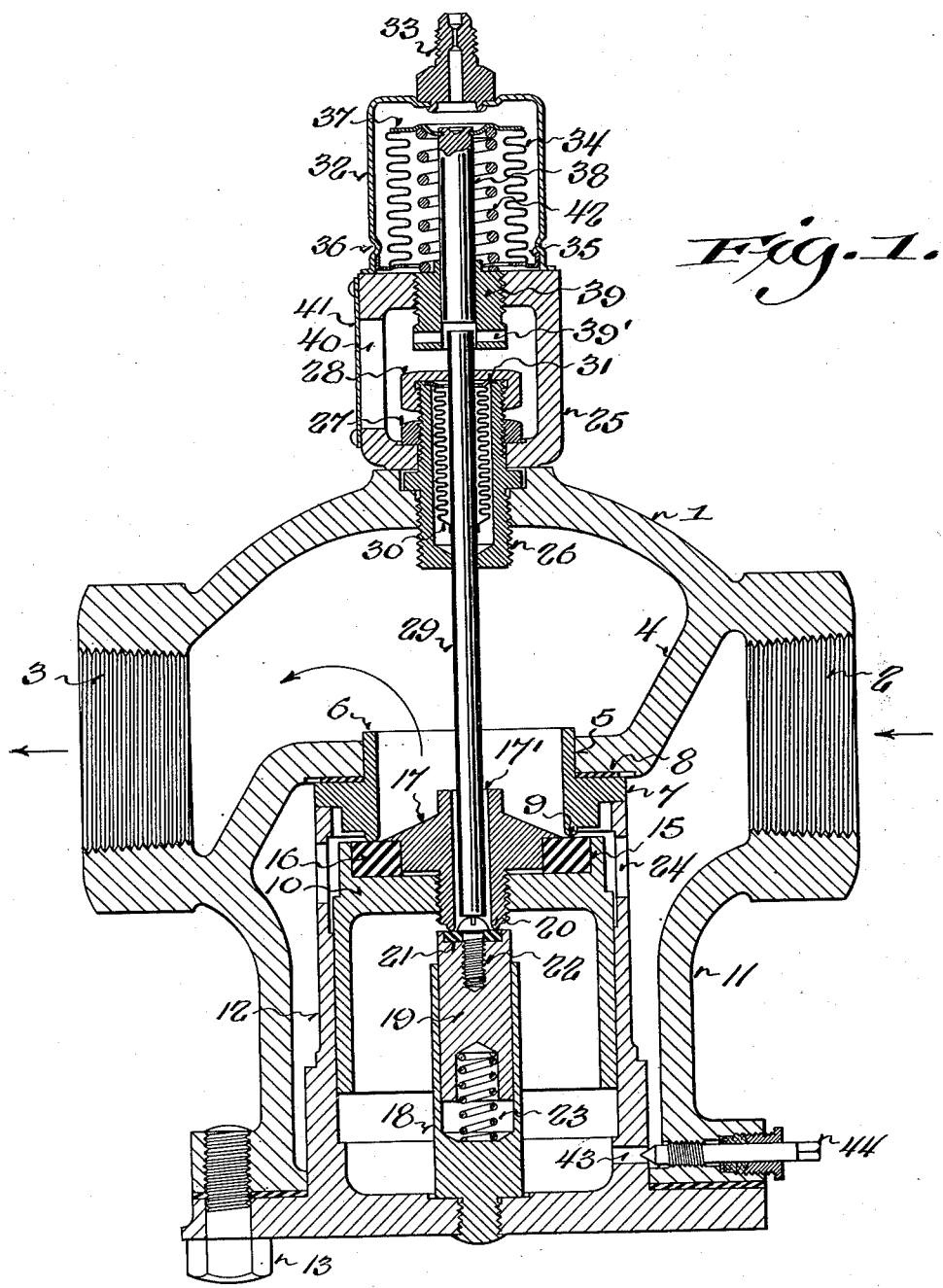
Figure 1 is a vertical section through a valve constructed in accordance with one form of the present invention.

Referring now more particularly to the accompanying drawings, in that form of the invention disclosed in Figure 1, the numeral 1 designates a valve casing provided with an inlet 2 and an outlet 3, having disposed therebetween a partition 4 provided with an opening 5 in which a bushing 6 is fitted. The bushing 6 is provided with a flange 7, and disposed between the flange and the lower face of the partition 4 is a gasket 8, which effects a seal between the two members. At its lower end the bushing 6 is provided with a seat 9 for engagement with a piston valve 10, to be described hereinafter more in detail.

The casing 1 is provided with a depending cylindrical extension 11, open at its lower end for reception of a valve cage 12, secured to the extension in any suitable manner, such as bolts 13, illustrated in Figure 1, passing through the flanges of the cage and the extension 11. The cage 12 also serves to hold the bushing 6 within the opening 5 of the partition 4.

Slidably mounted within the cage 12 is the piston valve 10 provided with an annular recess 15 in its upper face for reception of a gasket 16, which is locked in position by a flanged head 17 threaded into the top of the valve 10. Within the cage 12 a well guide 18 is provided, which, as shown in Figures 1 and 2, is formed independently of the cage and threaded into its bottom. The guide 18 receives the shank of a pilot valve 19, designed to cooperate with a seat 20 formed on the lower end of the flanged head 17, carried by the valve 10, and to provide a tight seal with the seat 20 the upper end of the valve 19 is recessed for reception of a gasket 21 secured therein by a screw 22 for engagement with the seat 20.

An expansible coil spring 23 disposed between the shank of the valve 19 and the well guide 18 serves to normally urge the pilot valve into engagement with the seat 20. Orifices 24 formed in the cage 12 provide communication between the inlet side of the valve casing and the bushing 6, as will be hereinafter described.

In that form of the invention illustrated in Figure 1, a cylindrical head 25 is mounted upon the top of the casing, and is secured thereto by means of a flanged thimble 26 threaded into the casing 1, and provided with a lock nut 27 bearing against the bottom of the head 25. The upper end of the thimble 26 is closed by a threaded cap 28 provided with an opening cooperating with an opening in the lower end of the thimble to guide the stem 29, which projects through an enlarged orifice 17' formed in the flanged head 17, and engages the head of the screw 22 of the pilot valve 19 for actuating the latter, as will be later described.

In order to effect a tight seal between the stem 29 and the thimble 26, a conventional bellows 30 is positioned within the recess in the thimble, and has its lower end secured to the stem in the usual manner, while its upper end is attached to a washer 31 locked between the top of the thimble and the cap 28.

Mounted upon the top of the head 25 is an inverted cup 32 provided with a threaded nipple 33, to which a pressure line (not shown) is coupled in the usual manner. Here it may be explained that the pressure introduced into the cup 13 serves as the actuating medium for controlling operation of the main piston valve 10, through actuation of the pilot valve 19, and while the pressure fluid introduced into the cup 32 may be taken from any source, it is to be understood that the pressure-actuating medium might be obtained from a thermal bulb, particularly in instances where temperature and pressure are so related that they vary in constant proportion to one another. Therefore, wherever pressure actuation is referred to, it is to be understood that the same may be derived from any source affected by the volume of the fluid to be regulated.

A bellows 34 is positioned within the cup 32, and is attached at its lower end to a flanged washer 35, which is anchored in the cup by means of an annular bead 36. The upper end of the bellows 34 is secured to a plate 37, which carries a depending pin 38, that projects through a plug 39 threaded into the top of the head 25. As best shown in Figure 1, the plug 39 is provided with spanner openings 39', and access is had to the plug through an opening 40 provided in the head 25, and normally covered by a closure plate 41. Disposed within the bellows 34, between the upper plate 37 and the plug 39, is an expansible coil spring 42, which opposes the pressure fluid entering the cup 32.

From the foregoing explanation, considered in connection with the accompanying drawings, the structure of that form of the invention illustrated in Figure 1 will be quite apparent, and therefore the operation of the valve will be described now in detail. With the parts of the valve in their normal position, as shown, the main piston valve 10 is held to the seat 9 by the pressure of the fluid against the bottom of the valve, the pressure fluid having access thereto through the port 43 formed in the cage 12 below the bottom of the piston valve. Assuming that the pressure of the fluid on the outlet side or top of the piston valve 10 is equal to the pressure exerted upon the lower face of the valve 10, no action occurs. However, should the actuating pressure fluid be increased beyond a predetermined value, the pressure in the cup 32 becomes effective, and working upon the plate 37 collapses the bellows 34 against the tension of the spring 42, causing the pin 38 to engage the stem 29 and open the pilot valve 19, which releases pressure on the lower side of the piston valve 10, through the orifice 17', causing the piston valve to open and admit pressure fluid through the ports 24 in the cage 12, and through the bushing 6 to the discharge side of the valve. When the actuating pressure again reaches its predetermined value, the pressure of the fluid in the cup 32 is overcome by the tension of the spring 42, which is determined by adjustment of the threaded plug 39.

As the spring raises the plate 37 of the bellows 34, together with the pin 38, obviously the stem 29 is released, permitting the spring 23 to return the pilot valve to its seat, whereupon the fluid entering the valve casing exerts its pressure upon the bottom of the valve 10, causing the same to seat and close the valve. The foregoing cycle of operation is repeated with any variation of the actuating pressure fluid, and, as will be now explained, by use of the pilot valve functioning in conjunction with the main piston valve, which is the salient feature of the present invention, the foregoing operation is accomplished to a high degree of accuracy, quiet operation, elimination of chattering, and both tight closing and full opening of the main valve when required.

Since the capacity of the valve increases in direct proportion to the increase in the controlled fluid pressure, and the opening and closing differential decreases to an undesirable small value, it is highly essential to regulate the characteristics of the valve. This is accomplished in that form of the invention illustrated in Figures 1, 2, and 3 by means of a manually controlled by-pass between the fluid supply and the lower side of the piston. In Figure 1 this comprises the port 43 and the manually operable needle valve 44.

It will thus be seen that the flow of fluid to the lower side of the piston valve 10 may be increased or decreased to provide the same relative results that will be otherwise obtained by varying the clearance between the piston valve 10 and the cage 24. However, it will be appreciated that the latter arrangement is not as practical as a manually controlled by-pass, as some difficulty is encountered in determining the proper clearances, and these would have to be varied by replacement of different size pistons for variations of pressure of the supply fluid. That form of the invention illustrated in Figure 4, which will be later described, eliminates the manually controlled by-pass, and provides clearance between the piston valve and cage, which is entirely satisfactory for a constant supply pressure, but, as explained, variations in the supply pressure can only be taken care of by replacement of the piston valves to provide the proper clearance in proportion to the supply pressure, which presents the obvious objections enumerated.

It will be further apparent that opening of the by-pass port 43 in Figure 1 will decrease the fixed maximum capacity, and increase the differential between closed and open positions of the main piston valve 10. In this manner it is possible to adjust the capacity of the valve to a constant value less than normal maximum, for all pressure conditions up to fifty per cent of their maximum value.

That form of the invention shown in Figure 2 is in all essential respects identical with the structure heretofore described and illustrated in Figure 1, with the exception that instead of a by-pass port being formed in the cage, a coupling 45 is threaded into the lower end of the cage and connected by a tube 46 with a needle valve fitting 47 threaded into the valve casing 1 on the supply side of the same. Under certain conditions this apparatus has its advantages, although it will be obvious that the same will function to produce identical results of the by-pass shown in Figure 1, in that the supply fluid passing to the under side of the piston valve can be controlled in like manner by the needle valve 44.

Also, in that form of the invention shown in Figure 2 a screen or perforated shell 48 surrounds the cage 12 to prevent sediment and foreign matter from passing through the valve. This, however, is optional.

In Figure 3 still another form of by-pass is disclosed, wherein the cage is provided with connecting ports 49 forming a communication between the outside of the cage and the under side of the piston. In this instance a manually controlled valve 44 is directly carried by the cage 6, and is removable therewith, which eliminates the necessity of alining openings in the cage and valve casing, as in Figures 1 and 2.

Referring now to the modification illustrated in Figure 4, aside from elimination of a manually controlled by-pass, the valve functions and operates in the same manner, as heretofore explained in connection with the other forms of the invention, and therefore the only distinction resides in structural design.

For instance, in that form of the invention illustrated in Figure 1, a separate threaded thimble 26 is provided for guiding the stem 29 and housing the sealing bellows, whereas in Figure 4 this is accomplished by a boss 25' formed integrally with the valve casing 1, and threaded at its outer end to receive a lock nut 27 for securing a spider 25' on the casing, the spider serving the same function as the head 25 illustrated in Figure 1.

Also, in the other forms of the invention illustrated, the well guide 18 is formed separately from the cage, whereas in Figure 4 the well 18 is formed integrally with the cage. In Figure 1 the cage is bolted to the bottom of the valve casing, while in Figures 2 to 4, inclusive, the cages are threaded therein. However, it is to be understood that such distinctions are merely contemplated for manufacturing purposes, and do not affect the salient features and operations of the invention.

As previously explained, the piston valve 10', as shown in Figure 4, is provided with sufficient clearance to permit the desired amount of supply fluid to pass through the openings 24 in the cage, and pass downwardly around the piston to exert pressure upon its lower face.

From the foregoing, it will be seen that an exceedingly novel type of regulating valve has been provided, which is highly sensitive, and therefore enables regulation with extreme accuracy, together with smooth, quiet operation, all of which is dependent upon the pilot valve functioning in cooperation with the main piston valve.

Attention is further directed to the fact that the present invention not only provides for regulation, but also has a modulating action heretofore unobtainable in valves of conventional types, in that only a very slight opening of the pilot valve is required in order to release the supply fluid from beneath the piston faster than the same can enter either through the clearance between the valve and cage, or through the by-pass ports, thus causing the main valve to quickly open, and follow the pilot valve, again restricting the opening through the main valve, to only that capacity required for the desired operation of the valve 10 essential to accurate and modulating action, rather than a fast, excessive opening and closing as occurs in conventional types of valves. It will further be noted that inasmuch as the shank of the pilot valve is snugly fitted within a well guide, the well serves as a dash-pot to retard its action, thus eliminating rapid, jerky action of the pilot valve. The same is also true as regards the piston valve, the skirt of which works in the cage.

Having thus described several forms of the present invention in considerable detail, it is to be understood that various changes in structural design are contemplated as coming within the scope of the invention, and therefore the same is only to be limited in accordance with the following claims.

I claim:

1. A modulating valve for regulating fluid flow comprising, a valve casing having a pressure fluid inlet and an outlet, a partition between said inlet and the outlet provided with an opening, a cylindrical valve guide positioned in said casing on the inlet side of said partition, a floating piston valve slidable in said guide for controlling said partition opening to regulate the flow of fluid therethrough and actuated by differential pressures upon its opposite faces, said piston valve having a pilot opening surrounded by a valve seat, a pilot valve engaging said valve seat upon a plane, a stem slidably guided in said casing for abutting engagement with said pilot valve for controlling the same, a well carried by said casing for snugly receiving the shank of said pilot valve to guide said pilot valve entirely independent of said piston and provide a dash-pot opposing its movement, a spring urging said pilot valve toward its seat, and means actuated by fluid pressure other than that within the valve casing for operating said stem.

2. A modulating valve for regulating fluid flow comprising, a valve casing having a pressure fluid inlet and an outlet, a partition between said inlet and the outlet provided with an opening, a cylindrical valve guide positioned in said casing on the inlet side of said partition, a floating piston valve slidable in said guide for controlling said partition opening to regulate the flow of fluid therethrough and actuated by differential pressures upon its opposite faces, said piston valve having a pilot opening surrounded by a valve seat, a pilot valve engaging said valve seat upon a plane, a stem slidably guided in said casing for abutting engagement with said pilot valve for controlling the same, a sylphon seal between said stem and valve casing, a well carried by said casing for snugly receiving the shank of said pilot valve to guide said pilot valve entirely independent of said piston and provide a dash-pot opposing its movement, a spring urging said pilot valve toward its seat, and means actuated by fluid pressure other than that within the valve casing for operating said stem.

3. A modulating valve for regulating fluid flow comprising, a valve casing having a pressure fluid inlet and an outlet, a partition between said inlet and the outlet provided with an opening, a cylindrical valve guide positioned in said casing on the inlet side of said partition, a floating piston valve slidable in said guide for controlling said partition opening to regulate the flow of fluid therethrough and actuated by differential pressures upon its opposite faces, said piston valve having a pilot opening surrounded by a valve seat, a pilot valve engaging said valve seat upon a plane, a stem slidably guided in said casing for abutting engagement with said pilot valve for controlling the same, a sylphon seal between said stem and valve casing, a well carried by said casing for snugly receiving the shank of said pilot valve to guide said pilot valve entirely independent of said piston and provide a dash-pot opposing its movement, a spring urging said pilot valve toward its seat, and a fluid-actuated sylphon affected by pressure other than that within the valve casing for opening said pilot valve.

CHAS. F. TOUSSAINT.